(12) United States Patent
Li et al.

(10) Patent No.: US 11,695,532 B2
(45) Date of Patent: Jul. 4, 2023

(54) TRANSMISSION TIME INTERVAL (TTI) SCHEDULING FOR PHYSICAL UPLINK SHARED CHANNEL (PUSCH) TRANSMISSIONS

(71) Applicant: Intel Corporation, Santa Clara, CA (US)

(72) Inventors: Yingyang Li, Beijing (CN); Yongjun Kwak, Portland, OR (US); Lopamudra Kundu, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 123 days.

(21) Appl. No.: 16/987,295

(22) Filed: Aug. 6, 2020

(65) Prior Publication Data

US 2020/0389280 A1 Dec. 10, 2020

Related U.S. Application Data

(60) Provisional application No. 62/884,539, filed on Aug. 8, 2019, provisional application No. 62/884,124, filed on Aug. 7, 2019.

(51) Int. Cl.
*H04L 5/00* (2006.01)
*H04L 1/16* (2023.01)
(Continued)

(52) U.S. Cl.
CPC .......... *H04L 5/0082* (2013.01); *H04L 1/1642* (2013.01); *H04W 72/0446* (2013.01); *H04W 72/1263* (2013.01); *H04W 72/23* (2023.01)

(58) Field of Classification Search
CPC ... H04L 5/0082; H04L 1/1642; H04L 1/1819; H04L 1/1893; H04L 1/1896; H04L 5/0007; H04L 5/001; H04L 5/0048; H04L 5/0051; H04L 27/0006; H04L 5/0044; H04L 5/0053; H04W 72/042; H04W 72/0446; H04W 72/1263
See application file for complete search history.

(56) References Cited

U.S. PATENT DOCUMENTS 10,334,581 B2 * 6/2019 Dinan ............... H04W 72/1289
10,779,333 B2 * 9/2020 Ye ..................... H04W 74/0833
(Continued)

FOREIGN PATENT DOCUMENTS

| WO | WO-2018201982 A1 * | 11/2018 | ........... H04L 1/0003 |
| WO | WO-2019160363 A1 * | 8/2019 | ........... H04L 1/0013 |
| WO | WO-2020069359 A1 * | 4/2020 | ........... H04L 1/1887 |

OTHER PUBLICATIONS

3GPP, "Technical Specification Group Radio Access Network; Study on NR-based access to unlicensed spectrum (Release 16)," 3GPP TR 38.889 V16.0.0 (Dec. 2018), 5G, 119 pages TR 38.889.

*Primary Examiner* — Yemane Mesfin
*Assistant Examiner* — Jeff Banthrongsack
(74) *Attorney, Agent, or Firm* — Schwabe, Williamson & Wyatt, P.C.

(57) ABSTRACT

Methods, systems, and storage media are described for multi-transmission time interval (TTI) physical uplink shared channel (PUSCH) transmissions. In particular, some embodiments relate to downlink control information (DCI) enhancements to support dynamic switching between single-TTI scheduling and multi-TTI scheduling. Other embodiments may be described and/or claimed.

16 Claims, 9 Drawing Sheets

(51) Int. Cl.
  *H04W 72/12* (2023.01)
  *H04W 72/04* (2023.01)
  *H04W 72/1263* (2023.01)
  *H04L 1/1607* (2023.01)
  *H04W 72/0446* (2023.01)
  *H04W 72/23* (2023.01)

(56) References Cited

U.S. PATENT DOCUMENTS

| | | | | |
|---|---|---|---|---|
| 11,398,930 B2* | 7/2022 | Kwak | ............... | H04W 72/042 |
| 2017/0273071 A1* | 9/2017 | Nogami | ............ | H04W 72/0413 |
| 2018/0092071 A1* | 3/2018 | Dinan | ............... | H04L 1/1812 |
| 2018/0110084 A1* | 4/2018 | Dinan | ............... | H04W 76/28 |
| 2018/0160445 A1* | 6/2018 | Babaei | ............... | H04W 72/14 |
| 2019/0074937 A1* | 3/2019 | Bhattad | ............... | H04L 1/1819 |
| 2019/0149365 A1* | 5/2019 | Chatterjee | ............. | H04L 5/0044 |
| | | | | 370/329 |
| 2019/0253531 A1* | 8/2019 | Basu Mallick | ......... | H04L 69/22 |
| 2019/0261391 A1* | 8/2019 | Kundu | ............... | H04W 72/0446 |
| 2019/0313386 A1* | 10/2019 | Hwang | ............... | H04W 72/12 |
| 2019/0327755 A1* | 10/2019 | Xiong | ............... | H04L 1/1887 |
| 2020/0044785 A1* | 2/2020 | Park | ............... | H04W 76/30 |
| 2020/0084005 A1* | 3/2020 | Yoshimura | ............ | H04L 27/26 |
| 2020/0107353 A1* | 4/2020 | Jung | ............... | H04L 1/0038 |
| 2020/0162208 A1* | 5/2020 | Moon | ............... | H04L 1/1816 |
| 2020/0351934 A1* | 11/2020 | Khoshnevisan | ...... | H04W 72/14 |
| 2021/0282137 A1* | 9/2021 | Wang | ............... | H04W 72/0446 |
| 2021/0328728 A1* | 10/2021 | El Hamss | ............ | H04L 5/0091 |
| 2022/0006571 A1* | 1/2022 | Basu Mallick | ....... | H04L 1/1835 |
| 2022/0174667 A1* | 6/2022 | Lei | ............... | H04L 5/0044 |
| 2022/0239417 A1* | 7/2022 | Cheng | ............... | H04L 1/1896 |

* cited by examiner

100

Retrieving information regarding one or more transport blocks (TBs) of a physical uplink shared channel (PUSCH)
105

Determining one or more new data indicators (NDIs) for the respective one or more TBs based on the information regarding the one or more TBs
110

Encoding a downlink control information (DCI) message for transmission to a user equipment (UE) to schedule transmission of one or more TBs in a respective one or more transmission time intervals (TTIs), wherein the DCI includes the one or more NDIs and an indication of a number of the one or more transmission time intervals (TTIs)
115

Determining one or more new data indicator (NDIs) associated with one or more transport blocks (TBs)
205

Encoding a downlink control information (DCI) message for transmission to a user equipment (UE) that includes an indication of the one or more NDIs and an indication of a number of scheduled transmission time intervals (TTIs) for a physical uplink shared channel (PUSCH)
210

FIG. 2

300 

Receiving a downlink control information (DCI) message that includes an indication of one or more new data indicators (NDIs) associated with a respective one or more transport block (TBs) for transmission of a physical uplink shared channel (PUSCH) in a respective number of one or more scheduled transmission time intervals (TTIs) for the PUSCH
305

Encoding the PUSCH for transmission based on the DCI
310

FIG. 3

TRANSMISSION TIME INTERVAL (TTI) SCHEDULING FOR PHYSICAL UPLINK SHARED CHANNEL (PUSCH) TRANSMISSIONS

RELATED APPLICATIONS

This application claims priority to U.S. Provisional Patent Application No. 62/884,124 filed Aug. 7, 2019 and entitled "MULTIPLE TRANSMISSION TIME INTERVAL (MULTI-TTI) PHYSICAL UPLINK SHARED CHANNEL (PUSCH) TRANSMISSION AND MULTIPLEXING IN NEW RADIO (NR) SYSTEMS OPERATING ON UNLICENSED SPECTRUM," and to U.S. Provisional Patent Application No. 62/884,539 filed Aug. 8, 2019 and entitled "MULTIPLE TRANSMISSION TIME INTERVAL (MULTI-TTI) PHYSICAL UPLINK SHARED CHANNEL (PUSCH) TRANSMISSION AND MULTIPLEXING IN NEW RADIO (NR) SYSTEMS OPERATING ON UNLICENSED SPECTRUM," the entire disclosures of which are incorporated by reference in their entirety.

FIELD

Embodiments of the present disclosure relate generally to the technical field of wireless communications.

BACKGROUND

Among other things, embodiments of the present disclosure relate to multi-transmission time interval (TTI) physical uplink shared channel (PUSCH) transmissions. In particular, some embodiments relate to downlink control information (DCI) enhancements to support dynamic switching between single-TTI scheduling and multi-TTI scheduling.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 1 and 2, and 3 illustrate examples of operation flow/algorithmic structures in accordance with some embodiments.

DETAILED DESCRIPTION

Figure 4A:
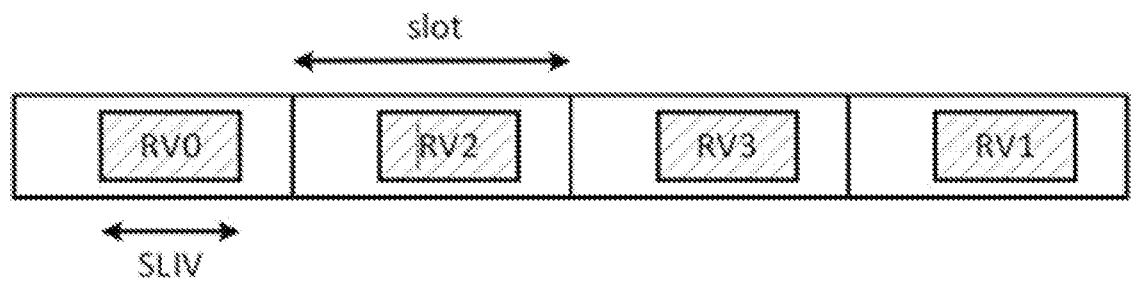
FIG. 4A illustrates an example of mini-slot-based PUSCH in accordance with some embodiments.

Among other things, embodiments of the present disclosure relate to multi-transmission time interval (TTI) physical uplink shared channel (PUSCH) transmissions. In particular, some embodiments relate to downlink control information (DCI) enhancements to support dynamic switching between single-TTI scheduling and multi-TTI scheduling. Other embodiments may be described and/or claimed.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like may refer to the same, or different, embodiments. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Examples of embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Examples of embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

Each year, the number of mobile devices connected to wireless networks significantly increases. In order to keep up with the demand in mobile data traffic, necessary changes have to be made to system requirements to be able to meet these demands. Three critical areas that need to be enhanced in order to deliver this increase in traffic are larger bandwidth, lower latency, and higher data rates.

One of the major limiting factors in wireless innovation is the availability of spectrum. To mitigate this, the unlicensed spectrum has been an area of interest to expand the availability of long term evolution (LTE). In this context, one of the major enhancements for LTE in third generation partnership project (3GPP) Release 13 has been to enable its operation in the unlicensed spectrum via Licensed-Assisted Access (LAA), which expands the system bandwidth by utilizing the flexible carrier aggregation (CA) framework introduced by the LTE-Advanced system.

Now that the main building blocks for the framework of new radio (NR) have been established, a natural enhancement is to allow this to also operate on unlicensed spectrum. The work to introduce shared/unlicensed spectrum in fifth generation (5G) NR has already kicked off, and a new work item (WI) on "NR-Based Access to Unlicensed Spectrum" was approved in technical specification group (TSG) radio access network (RAN) Meeting #82. The objectives of this new WI include:

Physical layer aspects including RAN 1, which includes:
   Uplink (UL) data channel including extension of physical uplink shared channel (PUSCH) to support physical resource block (PRB) based frequency block-interlaced transmission; support of multiple PUSCH(s) starting positions in one or multiple slot(s) depending on the listen before talk (LBT) outcome with the understanding that the ending position is indicated by the UL grant; design not requiring the user equipment (UE) to change a granted transport block size (TBS) for a PUSCH transmission depending on the LBT outcome. The necessary PUSCH enhancements based on cyclic prefix orthogonal frequency division multiplexing (CP-OFDM). Applicability of sub-PRB frequency block-interlaced transmission for 60 kilohertz (kHz) to be decided by RAN1, and
   Sounding reference signal (SRS) including the introduction of additional flexibility in configuring/triggering a SRS in line with agreements during the study phase; and
Physical layer procedure(s) including RAN1 and RAN2, which includes:
   Scheduling request: specify required NR modifications due to LBT failure in line with agreements during the study phase. (RAN1/RAN2), and
   Scheduling multiple TTIs for PUSCH in-line with agreements from the study phase (TR 38.889, Section 7.2.1.3.3, v. 16.0.0, Dec. 19, 2018). (RAN1).

From the objective, multiple transmission time interval (multi-TTI) PUSCH scheduling is supported in unlicensed spectrum (NR-U). Multi-TTI PUSCH scheduling has the benefit of downlink control information (DCI) overhead reduction with limitation on the PUSCH transmission in each TTI. Multiplexing a multi-TTI PUSCH with other UL signals is another issue to be solved. In order to overcome the issues, one or more embodiments described herein provide details on the design of multi-TTI PUSCH transmission that assists with providing an efficient way to operate in unlicensed spectrum.

In some embodiments, in a NR system operating in the unlicensed spectrum, to support multi-TTI PUSCH transmission, a nominal TTI crossing slot boundary is handled so that a TTI is always within a slot. SRS multiplexing with multi-TTI is supported for scheduling flexibility.

Mini-Slot Time Resource Allocation for Multi-TTI PUSCH

NR release 15 (Rel-15) supports mini-slot based PUSCH resource allocation with repetition. As shown in FIG. 4A, a mini-slot PUSCH resource is configured by a start and length indicator value (SLIV) resource that is repeatedly allocated in N consecutive slots. Different redundancy versions (RVs) could be used in each repetition.

In NR-U, multi-TTI PUSCH is supported. That is, a single DCI can be used to schedule UL resources of N nominal TTIs, where N is greater than or equal to one. Due to the limitation of LBT operation, it is desirable that time resource of the N nominal TTIs should be continuous in time so that only one LBT is required for the transmission of N nominal TTIs. Different nominal TTIs may have the same or different lengths in terms of number of symbols. It is possible that a nominal TTI may go across the slot boundary. Further, it is possible that a nominal TTI may go across downlink (DL) or UL switching point. In one or more embodiments described herein, a nominal TTI is the unit for time domain resource allocation. It is, however, to be appreciated that a nominal TTI is not necessarily a time unit for PUSCH transmission. The time unit for PUSCH transmission is a TTI. The TTIs for PUSCH transmission are derived from the N nominal TTIs. For example, as in NR Rel-15, a TTI is used to carry a PUSCH with mapping type A or type B.

Figure 4B:
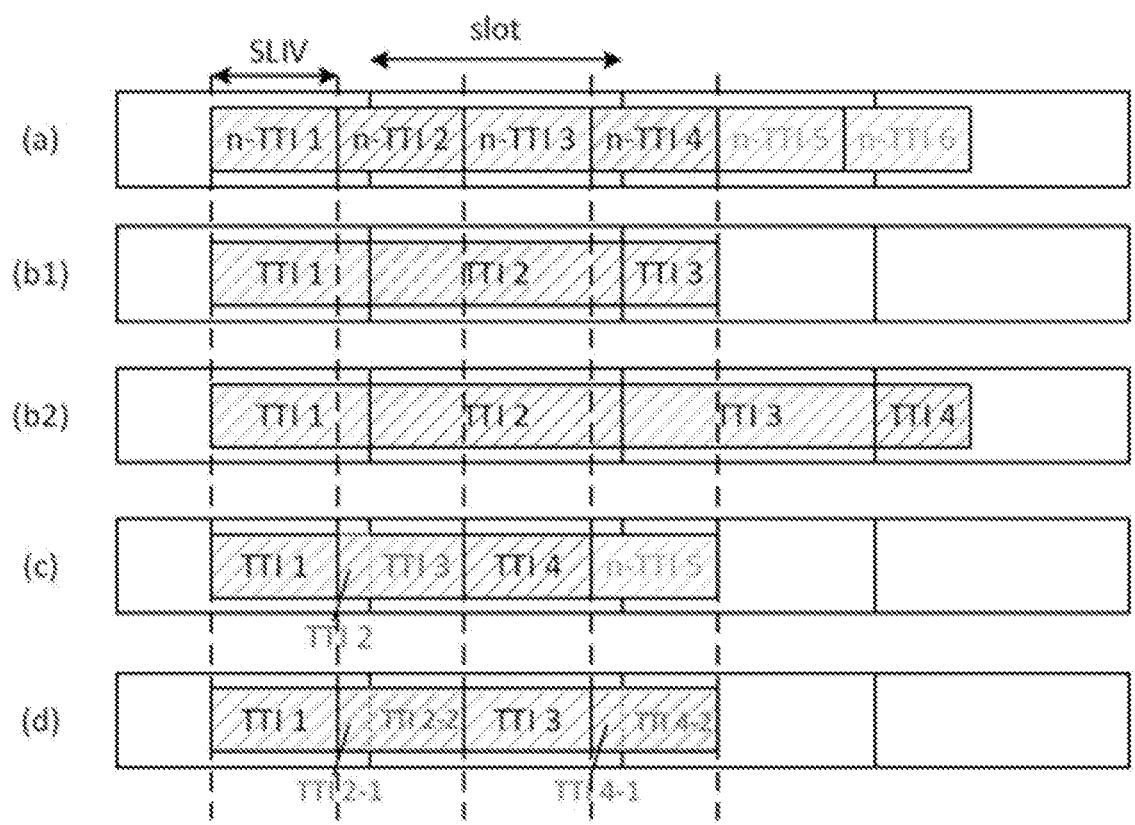
FIG. 4B illustrates an example of handling a nominal TTI across a slot boundary in accordance with some embodiments.

If a nominal TTI is crossing a slot boundary, the nominal TTI is divided into two parts, with the time resource of each part being within each slot. As shown in FIG. 4B, row (a), the second nominal TTI (n-TTI), e.g., n-TTI 2, is divided into two parts at the slot boundary. The same division happens for the fourth or sixth nominal TTIs.

In one embodiment, for a nominal TTI k that is divided into two parts, the first part is merged into the nominal TTI k−1 and the second part is merged into nominal TTI k+1. If a nominal TTI k+1 doesn't exist, the second part is considered as the nominal TTI k+1 and is not merged with others.

In this way, each of the remaining nominal TTIs can be located within a slot and no cross-slot TTI happens. Each of the remaining nominal TTIs is mapped to a TTI and is indexed consecutively. Each TTI transmits a different transport block (TB). From a DCI, a UE could interpret the number of nominal TTIs that are allocated to the UE, and then the UE could derive the number of TTIs from the number of nominal TTIs and potential slot crossings. The DCI contains scheduling information for each TB or for each TTI. As shown in FIG. 4B, row (b1), the first part of nominal TTI 2 is merged with nominal TTI 1 and forms TTI 1. The second part of nominal TTI 2, nominal TTI 3 and the first part of nominal TTI 4 are merged into TTI 2. The second part of nominal TTI 4 is TTI 3. That is, 3 TTIs are derived for PUSCH transmission, though the total time resources equals to four nominal TTIs from the DCI information. In FIG. 4B, row (b2), TTI 1 and TTI 2 are the same as FIG. 4B, row (b1), while the second part of nominal TTI 4, nominal TTI 5 and the first part of nominal TTI 6 are merged into TTI 3. The second part of nominal TTI 6 is TTI 4. Therefore, a next generation NodeB (gNB) may allocate 6 nominal TTIs for the PUSCH transmission of 4 TTIs.

In one embodiment, for a nominal TTI that is divided into two parts, each part is treated as a separate TTI. While, for a nominal TTI contained in a slot, it is mapped to a single TTI. The TTIs derived from the nominal TTIs are indexed consecutively. Each TTI transmits a different TB. The DCI contains scheduling information for each TB or for each TTI. As shown in FIG. 4B, row (c), the nominal TTI 1 is TTI 1. The first part of nominal TTI 2 serves as TTI 2 and the second part of nominal TTI 2 serves as TTI 3. The nominal TTI 3 is TTI 4. For a DCI scheduling PUSCH of 4 TTIs, only the time resource of 3 nominal TTIs are applicable to this embodiment. As shown in FIG. 4B, row (c), the nominal TTI 4 will be TTI index larger than 5 which could be beyond the scheduling capability of the DCI.

In one embodiment, for a nominal TTI that is divided into two parts, the two parts are treated as different TTIs but transmit the same TB. In other words, it works as PUSCH repetition with repetition factor of two TTIs for this TB. The PUSCH resource mapping on each part being an individual TTI is done separately. For a nominal TTI contained in a slot, it is mapped to a TTI and transmit a separate TB. The DCI contains scheduling information for each TB or equivalently for each nominal TTI. In summary, a separate TB is transmitted on the time resource of each nominal TTI. As shown in FIG. 4B, row (d), the nominal TTI 1 is TTI 1 and transmits TB 1. The first part and the second part of nominal TTI 2 both transmit TB 2 potentially with different modulation scheme and/or different coding rate. The nominal TTI 3 is TTI 3 and transmits TB 3. Finally, the first part and the second part of nominal TTI 4 both transmit TB 4 potentially with different modulation scheme and/or different coding rate.

For a nominal TTI contained in a slot, TB size (TBS) for the TB is determined by number of resource elements (REs) of the TTI considering other kinds of overhead, e.g., as defined in NR Rel-15. While, for a nominal TTI divided into 2 TTIs and transmitted same TB, one issue is how to derive TBS of the TB transmitted on the two TTIs. The TBS could equal to a TBS derived for a nominal TTI that does not cross a slot boundary. In this scheme, the demodulation reference signal (DMRS) overhead for a nominal TTI crossing slot boundary may be larger since two TTIs are transmitted, but the TBS is kept the same as a nominal TTI that does not cross a slot boundary. Alternatively, a temporal TBS could be derived for each of the two TTIs. The two temporal TBSs could be summed together with potential quantization to get a final TBS for the nominal TTI. Alternatively, the TBS could be derived by considering the nominal TTI as a whole TTI. The DMRS in the entire TTI could be the same as the two TTIs divided by the nominal TTI. Even though a nominal TTI that crosses a slot boundary has the same number of symbols, for other nominal TTI that do not cross a slot boundary, the DMRS overhead could be larger. Consequently, the available REs for data transmission can be smaller for a nominal TTI that crosses a slot boundary. Therefore, the determined TBS for the entore TTI could be smaller than a TBS corresponding to a nominal TTI that does not cross a slot boundary.

For a nominal TTI contained in a slot, rate matching for the TB can be done according to the indicated redundancy version (RV) index by the DCI. If a nominal TTI is divided into 2 TTIs and same TB is transmitted using the 2 TTIs, one issue is how to derive a RV for the PUSCH transmission in the two TTIs. A reference RV index could be indicated for a nominal TTI by the DCI. The two TTIs could use the same RV, e.g., the indicated RV index. Alternatively, one TTI, e.g., the first TTI may use the indicated RV index, while the other TTI uses a RV index derived from the indicated RV index. For example, the RV index for the second TTI could be derived from mod(indicated RV index+c, N), where c is an offset and N is the total number of RV index. Alternatively, assuming N RV indexes are defined, only every other RV index, e.g., RV indexes 2j, j=0,1, . . . , N/2−1 can be indicated by a nominal TTI by the DCI. For a nominal TTI that crosses a slot boundary, one TTI (e.g., the first TTI, etc.) can use the indicated RV index, while the other TTI can use a RV index from RV indexes 2j+1, j=0,1, . . . , N/2−1. As another example, the RV index could be derived from mod(indicated RV index+1, N) or mod(indicated RV index+ 2*d+1, N), where d is a offset parameter. Alternatively, a single RV is generated according the indicated RV index and the number of bits of the RV is determined by the total number of data REs of the two TTIs. That is, the first part of the RV is mapped to the first TTI, while the remaining part of the RV is mapped to the second TTI. The number of bits in the first part of the RV is determined by the total number of data REs of the first TTI.

In one embodiment, if multiple TTIs are derived from the N nominal TTIs and each TTI carries a different TB, a UE could perform an LBT operation before the start of the first TTI of the multi-TTI PUSCH. If the UE fails to start a PUSCH transmission at the start of a TTI, the UE could try an LBT operation before the start of the next TTI.

In one embodiment, for a nominal TTI, if it is the starting nominal TTI for multi-TTI PUSCH transmission, a UE could perform an LBT operation before the start of the nominal TTI. If the UE fails to start PUSCH transmission at the start of a nominal TTI, the UE could perform an LBT operation before the start of the next nominal TTI. For a nominal TTI divided into two TTIs, if the UE fails to start PUSCH transmission at the start of the nominal TTI, the UE may perform another LBT operation before the start of the second TTI of the nominal TTI. Alternatively, the UE may drop the whole nominal TTI.

In one embodiment, for a nominal TTI that crosses a DL/UL switching point, the partial nominal TTI overlapped with UL symbols indicated by DL/UL slot format could be treated as a TTI. The TTI is may be used to transmit a separated TB. Alternatively, the UE may drop the nominal TTI.

SRS Transmission and Multi-TTI PUSCH

NR Rel-15 supports periodic, semi-periodic and aperiodic transmission of SRS. In Rel-15, it is up to a gNB to guarantee that a PUSCH and an SRS for a single UE are indicated in non-overlapping symbols. In NR-U, when multi-TTI PUSCH is scheduled, if a SRS symbol needs to be transmitted within the time period of PUSCH, the corresponding multiplexing rule needs to be defined. In the following embodiments, the multiplexing between SRS and multi-TTI PUSCH is done in time domain, while the frequency resource of SRS or multi-TTI PUSCH is not impacted.

In one embodiment, if an indicated SRS transmission is overlapped with a multi-TTI PUSCH, a UE could drop the SRS and transmit the multi-TTI PUSCH.

Figure 4C:
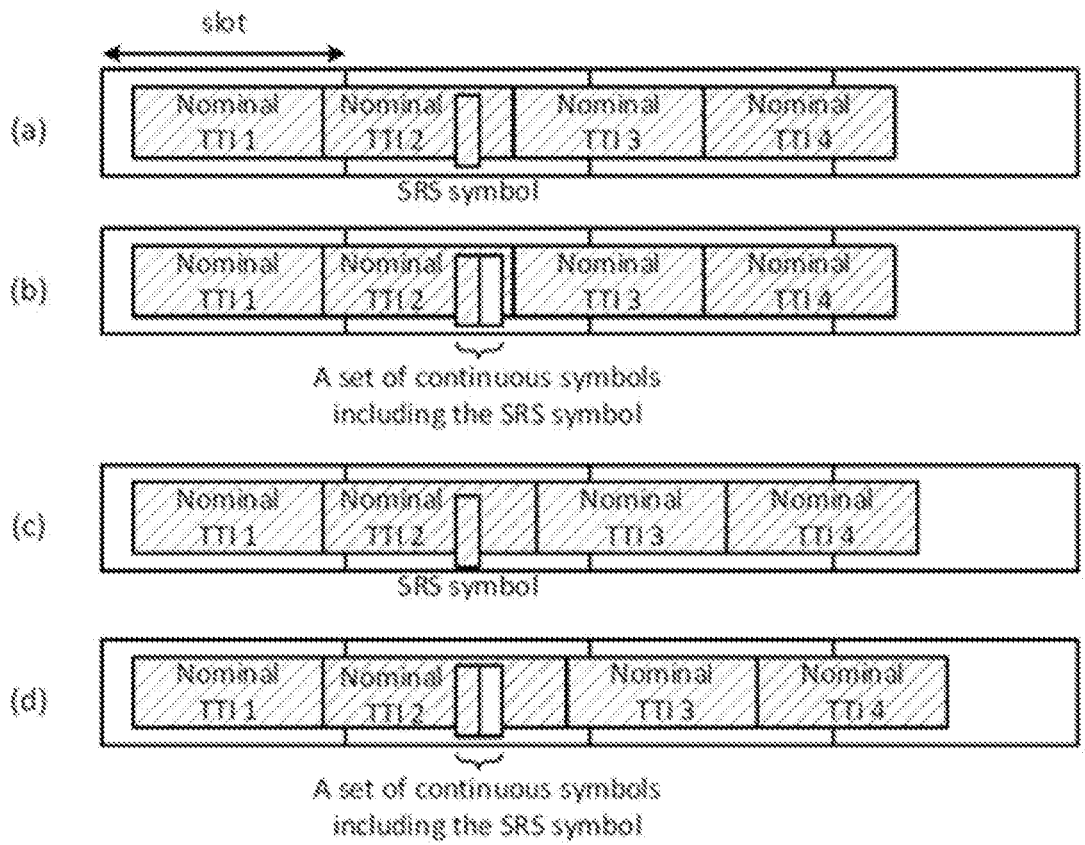
FIG. 4C illustrates an example of puncturing multi-TTI PUSCH due to SRS in accordance with some embodiments.

In one embodiment, if an indicated SRS transmission is overlapped with a multi-TTI PUSCH, a UE could drop the multi-TTI PUSCH in the overlapped SRS symbol and transmit the SRS. In one embodiment, if an indicated SRS transmission is overlapped with a multi-TTI PUSCH, a UE could transmit the indicated SRS transmission and drop the part of the multi-TTI PUSCH overlapped with a set of continuous symbols. Alternatively, in one embodiment, a set of continuous symbols is determined by an indicated SRS symbol, if the set of continuous symbols is overlapped with a multi-TTI PUSCH, a UE could transmit the indicated SRS transmission and drop the part of the multi-TTI PUSCH overlapped with the set of continuous symbols. The set of continuous symbols could include the indicated SRS symbols or could be a superset of the indicated SRS symbols. The set of continuous symbols could be derived by a predefined rule based on the indicated SRS symbol, or cold be configured by RRC signaling. As shown in FIG. 4C, row (a), the symbol in nominal TTI 2 overlapped with indicated SRS symbol is punctured. As shown in FIG. 4C, row (b), the symbols in nominal TTI 2 overlapped with a set of continuous symbols including the indicated SRS symbol are punctured.

In one embodiment, the PUSCH mapping for a nominal TTI of the multi-TTI PUSCH may not be impacted by an SRS transmission. That is, UE punctures the symbol(s) in the nominal TTI due to the SRS transmission. Specifically, if a nominal TTI is divided into two TTIs per the schemes disclosed in section "Mini-slot time resource allocation for multi-TTI PUSCH", the UE punctures the symbol(s) in each of the two TTIs due to SRS transmission.

Alternatively, after dropping certain symbol(s) of multi-TTI PUSCH due to SRS, if the remaining symbols of a nominal TTI are continuous, the remaining symbols could be treated as a shortened new nominal TTI. PUSCH mapping is done on the new nominal TTI, e.g., for PUSCH type B, the first symbol of the new nominal TTI is used to carry DMRS. The schemes disclosed in section "Mini-slot time resource allocation for multi-TTI PUSCH" could be used to handle the new nominal TTI. After dropping certain symbols due to SRS transmission, if the remaining symbols of a nominal TTI are separated into two groups, with each group occupying continuous symbols, the schemes disclosed in section "Mini-slot time resource allocation for multi-TTI PUSCH" could be used to handle the two groups of the nominal TTI. A group is considered as a part in the schemes disclosed in section "Mini-slot time resource allocation for multi-TTI PUSCH". For example, the two parts are treated as different TTIs but transmit the same TB. If a group is crossing slot boundary, the group is further divided into two parts with each part contained in a slot. The other group is a separate part. Consequently, the nominal TTI is divided into three parts. Each of the three parts could be treated as different TTIs that transmit the same TB.

In one embodiment, if an indicated SRS transmission is overlapped with a multi-TTI PUSCH, the multi-TTI PUSCH is extended by a number of symbols which equals to the number of the indicated SRS symbols. A UE could transmit the indicated SRS transmission and transmit the extended multi-TTI PUSCH. UE could drop the symbol(s) of the multi-TTI PUSCH overlapped with a set of continuous symbols. As shown in FIG. 4c, nominal TTI 2 is extended by a number of symbols which equals to the number of SRS symbols, so that the number of available symbols of nominal TTI 2 keeps unchanged.

If the first indicated SRS symbol is overlapped with a first symbol of a nominal TTI, the nominal TTI is delayed after the indicated SRS symbols. The schemes disclosed in section "Mini-slot time resource allocation for multi-TTI PUSCH" could be used to handle the delayed nominal TTI. If the first indicated SRS symbol is overlapped with a nominal TTI in a symbol other than the first symbol, the nominal TTI is divided into 2 groups, the first group corresponds to all symbols of the nominal TTI before the first indicated SRS symbol, while the second group corresponds to all remaining symbols of the nominal TT. The schemes disclosed in section "Mini-slot time resource allocation for multi-TTI PUSCH" could be used to handle the two groups of the nominal TTI. A group is considered as a part in the schemes disclosed in section "Mini-slot time resource allocation for multi-TTI PUSCH". For example, the two parts are treated as different TTIs that transmit the same TB. If a group is crossing slot boundary, the group is further divided into two parts with each part contained in a slot. Consequently, the nominal TTI is divided into up to four parts. The up to four parts could be treated as different TTIs that transmit the same TB.

Figure 4D:
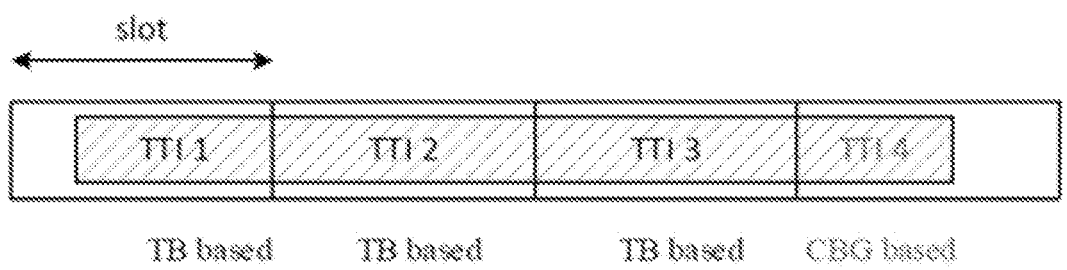
FIG. 4D illustrates an example of CBG-based transmission in accordance with some embodiments.

In one embodiment, if an indicated SRS transmission is overlapped with a multi-TTI PUSCH, the multi-TTI PUSCH is extended by a number of symbols that is equal to the number of symbols in a set of continuous symbols. Alternatively, in one embodiment, a set of continuous symbols is determined by an indicated SRS symbol, if the set of continuous symbols is overlapped with a multi-TTI PUSCH, the multi-TTI PUSCH is extended by a number of symbols that is equal to the number of symbols in the set of continuous symbols. The set of continuous symbols could include the indicated SRS symbols or could be a superset of the indicated SRS symbols. The set of continuous symbols could be derived by a predefined rule based on the indicated SRS symbol, or could be configured by radio resource control (RRC) signaling. A UE could transmit the indicated SRS transmission and transmit the extended multi-TTI PUSCH. The UE could drop the symbol(s) of the multi-TTI PUSCH overlapped with a set of continuous symbols. As shown in FIG. 4(d), the nominal TTI 2 is extended by a number of symbols that is equal to the number of symbols in a set of continuous symbols. In this way, the number of available symbols of the nominal TTI 2 remains unchanged.

If the first symbol of the set of continuous symbols is overlapped with a first symbol of a nominal TTI, the nominal TTI is delayed after the set of continuous symbols. The schemes disclosed in section "Mini-slot time resource allocation for multi-TTI PUSCH" could be used to handle the delayed nominal TTI. If the first symbol of set of continuous symbols is overlapped with a nominal TTI in a symbol other than the first symbol, the nominal TTI is divided into 2 groups, the first group includes all symbols of the nominal TTI before the set of continuous symbols, while the second group includes all remaining symbols of the nominal TTI. The schemes disclosed in section "Mini-slot time resource allocation for multi-TTI PUSCH" could be used to handle the two groups of the nominal TTI. A group is considered as a part in the schemes disclosed in section "Mini-slot time resource allocation for multi-TTI PUSCH". For example, the two parts are treated as different TTIs but transmit the same TB. If a group is crossing a slot boundary, the group is further divided into two parts with each part contained in a slot. Consequently, the nominal TTI is divided into up to four parts. The up to four parts are treated as different TTIs that transmit the same TB.

In one embodiment, different schemes that handle SRS and multi-TTI PUSCH multiplexing could be adopted for periodic SRS transmission, semi-periodic SRS transmission, aperiodic SRS transmission scheduled by a different DCI from the DCI scheduling multi-TTI PUSCH, and/or aperiodic SRS transmission scheduled by the same DCI scheduling multi-TTI PUSCH. In one example, for aperiodic SRS transmission scheduled by the same DCI scheduling multi-TTI PUSCH, if an indicated SRS transmission is overlapped with the multi-TTI PUSCH, a UE could drop the multi-TTI PUSCH in the overlapped SRS symbol(s) and transmit the SRS. For other kinds of SRS transmission, if an indicated SRS transmission is overlapped with a multi-TTI PUSCH, a different scheme could be used, e.g., a UE could drop the SRS and transmit the multi-TTI PUSCH. In another example, for aperiodic SRS transmission scheduled by the same DCI scheduling multi-TTI PUSCH, if an indicated SRS transmission is overlapped with the multi-TTI PUSCH, a UE could transmit the indicated SRS transmission and transmit the extended multi-TTI PUSCH. For other kinds of SRS transmission, if an indicated SRS transmission is overlapped with a multi-TTI PUSCH, a different scheme could be used, e.g., a UE could puncture the multi-TTI PUSCH and transmit SRS.

In the at least one of the embodiments set forth above, if the indicated SRS symbol does not immediately follow a symbol of the multi-TTI PUSCH transmission, the UE may perform an LBT operation to start the indicated SRS transmission. If the remaining multi-TTI PUSCH transmission is not immediately following the indicated SRS symbol, the UE may perform an LBT operation to start the remaining multi-TTI PUSCH transmission.

In one embodiment, for an aperiodic SRS triggered by a DCI scheduling multi-TTI PUSCH, the SRS symbols are positioned right after the end of the scheduled multi-TTI PUSCH.

In one embodiment, for an aperiodic SRS triggered by a DCI scheduling multi-TTI PUSCH, the maximum number of nominal TTIs scheduled is denoted as N and the potential positions for SRS symbol could be limited to, e.g., N+1 positions or a subset of the N+1 positions. The N+1 positions include the beginning of the first nominal TTI, the end of the last nominal TTI, or other positions between any two adjacent nominal TTIs. A benefit for such candidate positions is to avoid a nominal TTI being divided into two groups by the SRS transmission. In this scheme, the number of bits in DCI indicating SRS position could be ceil($\log_2$(N+1)) bits. For the position at the beginning of the first nominal TTI, the SRS transmission could use the symbol(s) right before the first nominal TTI. Alternatively, SRS transmission could punctures the first symbol(s) of the first nominal TTI. Alternatively, SRS transmission could use the first symbol(s) of the first nominal TTI, while the first nominal TTI is shifted after the SRS transmission. For the position at the end of the last nominal TTI, SRS transmission could use symbol(s) right after the last nominal TTI. Alternatively, SRS transmission could puncture the last symbol(s) of the last nominal TTI. For the position between two adjacent nominal TTIs, SRS transmission could puncture the last symbol(s) of the earlier nominal TTI. Alternatively, SRS transmission could use symbol(s) right after the earlier nominal TTI and the latter nominal TTI is shifted after the SRS transmission. Alternatively, SRS transmission could puncture the first symbol(s) of the latter nominal TTI.

In one embodiment, for an aperiodic SRS triggered by a DCI scheduling multi-TTI PUSCH, the potential positions for SRS symbol could be limited to, e.g., M+1 positions or a subset of the M+1 positions. Herein, denote maximum number of nominal TTIs scheduled as N, according to the schemes disclosed in section "Mini-slot time resource allocation for multi-TTI PUSCH", the N nominal TTIs indicated by a DCI is managed to form M TTIs. M could be less than, equal to or larger than N. For example, a nominal TTI crossing slot boundary is divided into 2 TTIs, therefore M could be larger than N in this case. The M+1 positions includes the beginning of the first TTI, the end of the last TTI or other positions between any two adjacent TTIs. A benefit for such candidate positions is to avoid that a TTI is divided into non-continuous symbols by the SRS transmission. In this scheme, the number of bits in DCI indicating SRS position could be ceil($\log_2$(M+1)) bits. For the position at the beginning of the first TTI, SRS transmission could use symbol(s) right before first TTI. Alternatively, SRS transmission could puncture the first symbol(s) of the first TTI. For the position at the end of the last TTI, SRS transmission could use symbol(s) right after the last TTI. Alternatively, SRS transmission could puncture the last symbol(s) of the last TTI. For the position between two adjacent TTIs, SRS transmission could punctures the last symbol(s) of the earlier TTI. Alternatively, SRS transmission could punctures the first symbol(s) of the latter TTI.

CBG Based PUSCH Transmission for Multi-TTI PUSCH

In a NR system operating on unlicensed spectrum, to support multi-TTI PUSCH transmission, code block group (CBG) based transmission applies to a transmission time interval (TTI) with the least number of symbols. A modulation and coding scheme (MCS) is properly designed to differentiate a new transmission and a retransmission. Downlink control information (DCI) size supporting dynamic switching between single-TTI scheduling and multi-TTI scheduling is minimized.

NR release 15 (Rel-15) supports code block group (CBG) based transmission. A transport block (TB) is divided into multiple CBGs. The retransmission of a CBG could be indicated separately by DCI. Therefore, the CBG transmission information (CBGTI) field, which indicates which CBGs are transmitted, is included in the DCI. NR Rel-15 supports 2, 4, 6, or 8 bits for CBGTI. However, if CBGTI is transmitted separately for every TTI of a multi-TTI PUSCH, it causes much overhead of the DCI.

In one embodiment, among N TTIs scheduled by a DCI, M TTIs with the least number of symbols are applicable for CBG based transmission, where M≤N and where each of M and N is an integer. M can be a constant value defined in a specification, e.g., 1, or M can be configurable by radio resource control (RRC) signaling. A transport block size (TBS) of a TB transmitted on M TTIs could be obtained by the initial transmission or by the most recent transmission of the TB. If there are multiple TTIs having the same number of symbols, a rule could be defined to select the M TTIs, e.g., the TTI with the lowest indexes are prioritized. For a retransmission based on a CBG, it is normally the case that only some of the CBGs need transmission. To keep a comparable coding rate for a new TB and a TB using CBG based retransmission, the least number of symbols could be allocated in the TTI for the CBG based retransmission, since all TTIs share the same frequency allocation for saving DCI overhead. Therefore, this embodiment may assist with improving resource efficiency. As shown in FIG. 4D, when M=1, a user equipment (UE) could determine that TTI 4 could use CBG based transmission according to a current time domain resource allocation in the example.

For scheduling flexibility, M hybrid automatic repeat request (HARM) process(es) using CBG based transmission could be indicated explicitly in the DCI. TBs corresponding to these M HARQ process(es) are then mapped into the M TTIs with the least number of symbols. Assuming up to N HARQ processes could be scheduled by the DCI and only one HARQ process could do CBG based transmission, e.g., M=1, the number of the bits indicating CBG based transmission could be ceil($\log_2(N)$) bits.

MCS Determination for Multi-TTI PUSCH

Multiple TTIs scheduled by a DCI can share a single MCS field in the DCI for overhead reduction. However, some TTIs of the multiple scheduled TTIs may be new transmissions, while other TTIs of the multiple scheduled TTIs may be retransmissions that have different demands for the MCS field. For a new transmission, the MCS must be explicitly indicated so that a UE can derive the TBS and the modulation order for the transmission. For a retransmission, a UE already knows the TBS, hence only the modulation order may need to be indicated. Indication of an MCS 0-28 that is suitable for a TTI of a new transmission sometimes causes difficulty for the MCS handling of a TTI for retransmission. In NR Rel-15, if a new data indicator (NDI) bit is toggled, when compared to a previous NDI bit for the same HARQ process, a new transmission is scheduled, otherwise, retransmission of the same TB is scheduled.

In one embodiment, the MCS indicated by a DCI is only applicable to TTIs of the multiple scheduled TTIs that are associated with a new transmission of a TB. For other TTIs of the multiple scheduled TTIs, the TBS and the modulation order are set as the TBS and the modulation order associated with the initial transmission of the same TB or the most recent transmission of the same TB, respectively.

In one embodiment, the MCS indicated by a DCI is only applicable to TTIs of the multiple scheduled TTIs that are associated with a new transmission of a TB. For other TTIs of the multiple scheduled TTIs, the TBS is set as the TBS associated with the initial transmission of the same TB. In this embodiment, the modulation order is set as the modulation order associated with the most recent transmission of the same TB.

In one embodiment, the MCS indicated by a DCI is applicable to a TTI of the multiple scheduled TTIs that is associated with a new transmission of a TB. For other TTIs of the multiple scheduled TTIs, the TBS is set as TBS associated with the initial transmission of the same TB or the most recent transmission of the same TB. In this embodiment, the UE can apply the modulation order associated with the MCS indicated by DCI.

In one embodiment, one bit in the DCI can indicate whether or not a TTI for retransmission should follow the MCS indicated in the DCI. If the bit is enabled, the UE uses the MCS in the DCI to derive a TBS of a HARQ process for retransmission. If the derived TBS is different from the TBS associated with an earlier transmission of the TB, the UE may drop the TBS associated with the earlier transmission and transmit the TB with the newly derived TBS. If the bit is disabled, the TBS and the modulation order are set as the TBS and the modulation order associated with the initial transmission of the same TB or the most recent transmission of the same TB, respectively. Alternatively, the TBS is set as the TBS associated with the initial transmission of the same TB. In this embodiment, the modulation order is set as the modulation order associated with the most recent transmission of the same TB. Alternatively, the TBS can be set as the TBS associated with the initial transmission of the same TB or the most recent transmission of the same TB. In this embodiment, the UE can apply the modulation order associated with the MCS indicated by DCI.

In one embodiment, whether the MCS field in a DCI is used to derive the TBS and the modulation order is controlled by some other field(s) in the DCI. For example, a redundancy value (RV) field in the DCI is used to differentiate between a new transmission and a retransmission for a HARQ process. If an RV index equals to 0, e.g., an RV with mostly systematic bits is scheduled, which is beneficial for initial transmission for one-shot decoding, the UE could rely on the MCS field in the DCI to derive the TBS and the modulation order. Otherwise, if the RV index equals other values, e.g. 2, the TBS and the modulation order are set as the TBS and the modulation order associated with the initial transmission of the same TB or the most recent transmission of the same TB, respectively. Alternatively, the TBS can be set as the TBS associated with the initial transmission of the same TB. In this embodiment, the modulation order is set as the TBS associated with the most recent transmission of the same TB. Alternatively, the TBS is set as the TBS associated with the initial transmission of the same TB or the most recent transmission of the same TB. In this embodiment, the UE applies the modulation order associated with the MCS indicated by DCI.

In one embodiment, assuming maximum N TTIs can be scheduled by a DCI and M of the maximum N TTIs can be scheduled for a CBG based transmission, where M≤N and each of M and N are integers, the MCS field in the DCI can be determined by the value of CBGTI field for a TB carried on the M TTIs. M can be a constant value defined in a specification, e.g. 1, or M can be configured by RRC signaling. If all CBGTI bits for a TB are '1', the UE uses the MCS in the DCI to derive a TBS for the TB. Otherwise, the TBS and the modulation order are set as the TBS and the modulation order associated with the initial transmission of the same TB or the most recent transmission of the same TB, respectively. Alternatively, the TBS can be set as the TBS associated with the initial transmission of the same TB. In this embodiment, the modulation order is set as the modulation order associated with the most recent transmission of the same TB. Alternatively, the TBS can be set as the TBS associated with the initial transmission of the same TB or the most recent transmission of the same TB. In this embodiment, the UE can apply the modulation order associated with the MCS indicated by the DCI. For example, if all CBGTI bits for the TB are '0', the UE assumes all CBGs associated with the TB are to be transmitted. In this way, a different handling of the MCS field is performed, when compared with the case where all CBGTI bits for the TB are '1'.

Dynamic Switching Between Single-TTI Scheduling and Multi-TTI Scheduling

NR-U will support scheduling multiple TTIs for PUSCH, e.g., scheduling multiple TBs with different HARQ process identifiers (IDs) over multiple TTIs, using a single uplink (UL) grant. Based on two DCI formats, 0_0 and 0_1, that are defined in NR Rel-15, new DCI format(s) scheduling a multi-TTI PUSCH can be designed. In one embodiment, single-TTI scheduling refers to the scheduling of a single TB by a DCI, while multi-TTI scheduling refers to the scheduling of multiple TBs by a DCI.

For a DCI for multi-TTI scheduling, the following design principles could be applied:
- New data indicator (NDI) is indicated per transport block (TB).
- Redundancy version (RV) is indicated per TB.
- The information on the number of TTI(s) scheduled is indicated. The information could be explicitly indicated, e.g., 2 bits could indicate 1-4 TTIs. Alternatively, the information could be jointly coded with other information, e.g., a time domain resource allocation (TDRA). In NR Rel-15, a codepoint of a TDRA field indicates a start and length indicator value (SLIV) in a slot, a physical downlink control channel (PDCCH) to a PUSCH scheduling delay (K2) and a PUSCH mapping type. A TDRA in NR-U may be extended to include information on a number of scheduled TTI(s). The number of TTIs for a codepoint of a TDRA can be explicitly configured. Alternatively, one or multiple SLIVs can be configured for a codepoint of a TDRA. The number of TTIs for a codepoint of a TDRA equals the number of configured SLIV(s).
- CBG transmission information (CBGTI) is another type of information that may need further consideration. If the CBGTI is transmitted per TB, it causes too much overhead. Therefore, it is preferable to include the CBGTI only when a single TB is scheduled.

In one embodiment, a single DCI format, denoted as DCI format C, supports dynamic switching between single-TTI scheduling and multi-TTI scheduling. A bit in DCI format C could be interpreted differently depending on whether single-TTI scheduling or multi-TTI scheduling is to be performed, e.g., for the indication of an NDI, an RV, and a CBGTI. When more than one TTI is scheduled, the DCI format C includes one or more of the following:
- 1 bit NDI per TB;
- 1 bit RV per TB; and
- No information on CBGTI, e.g., only TB based transmission is supported for the more than one TTIs scheduled.

Assuming a maximum of N TTIs can be scheduled, the overhead for the scenario set forth above is 2N bits, where N is an integer.

Alternatively, when more than one TTI is scheduled, the DCI format C includes one or more of the following:
- 1 bit NDI per TB;
- 1 bit RV per TB if more than two TTIs are scheduled, while 2 bits are used for a RV per TB if two TTIs are scheduled; and
- No information on CBGTI, e.g., only TB based transmission is supported for the more than one TTI scheduled.

Assuming a maximum of N TTIs can be scheduled and N is no less than 4, the overhead for the scenario set forth above is 2N bits, where N is an integer.

When a single TTI is scheduled, the DCI format C includes one or more of the following:
- 1 bit NDI for the TB;
- 1 bit RV for the TB;
- M-bit CBGTI to support CBG based transmission for the TB, where M is predefined or configured by RRC signaling and where M is an integer.

The total number of bits in a single TTI scheduling case is M+2, where M is an integer. A size of DCI format C for an NDI, an RV, and a CBGTI may be determined as max(2N, maxM+2), where maxM is the maximum number of M and where M is an integer. Alternatively, a size of DCI format C for for an NDI, an RV, and a CBGTI may be determined as max(2N, M+2). In this way, the size of DCI format C can be be varied with M, where M is an integer.

Alternatively, when a single TTI is scheduled, the DCI format C includes one or more of the following:
- 1 bit NDI for the TB;
- 2 bit RV for the TB, which is same as a DCI for single TTI scheduling; and
- M-bit CBGTI to support CBG based transmission for the TB. M is predefined or configured by RRC signaling.

The total number of bits in a single TTI scheduling case is M+3, where M is an integer. A size of the DCI format C for an NDI, an RV, and a CBGTI is determined as max(2N, maxM+3), where maxM is the maximum number of M and where each of M and N are integers. Alternatively, a size of the DCI format C for for an NDI, an RV, and a CBGTI may be determined as max(2N, M+3). In this way, a size of the DCI format C can be varied with, where M is an integer.

In one embodiment, the DCI format C for single TTI scheduling and the DCI format C for multi-TTI scheduling can be different DCI formats. That is, two DCI formats can be defined, denoted as DCI A and DCI B, which support single TTI scheduling and multi-TTI scheduling, respectively. DCI A and DCI B may have the same size. At least one bit of the DCI field can be used distinguish between DCI A and DCI B. In one embodiment, different radio network temporary identifiers (RNTIs) can be used to distinguish between DCI A and DCI B. In one embodiment, different control resource sets (CORESET) or different PDCCH search spaces can be used to distinguish between DCI A and DCI B.

Figure 5:
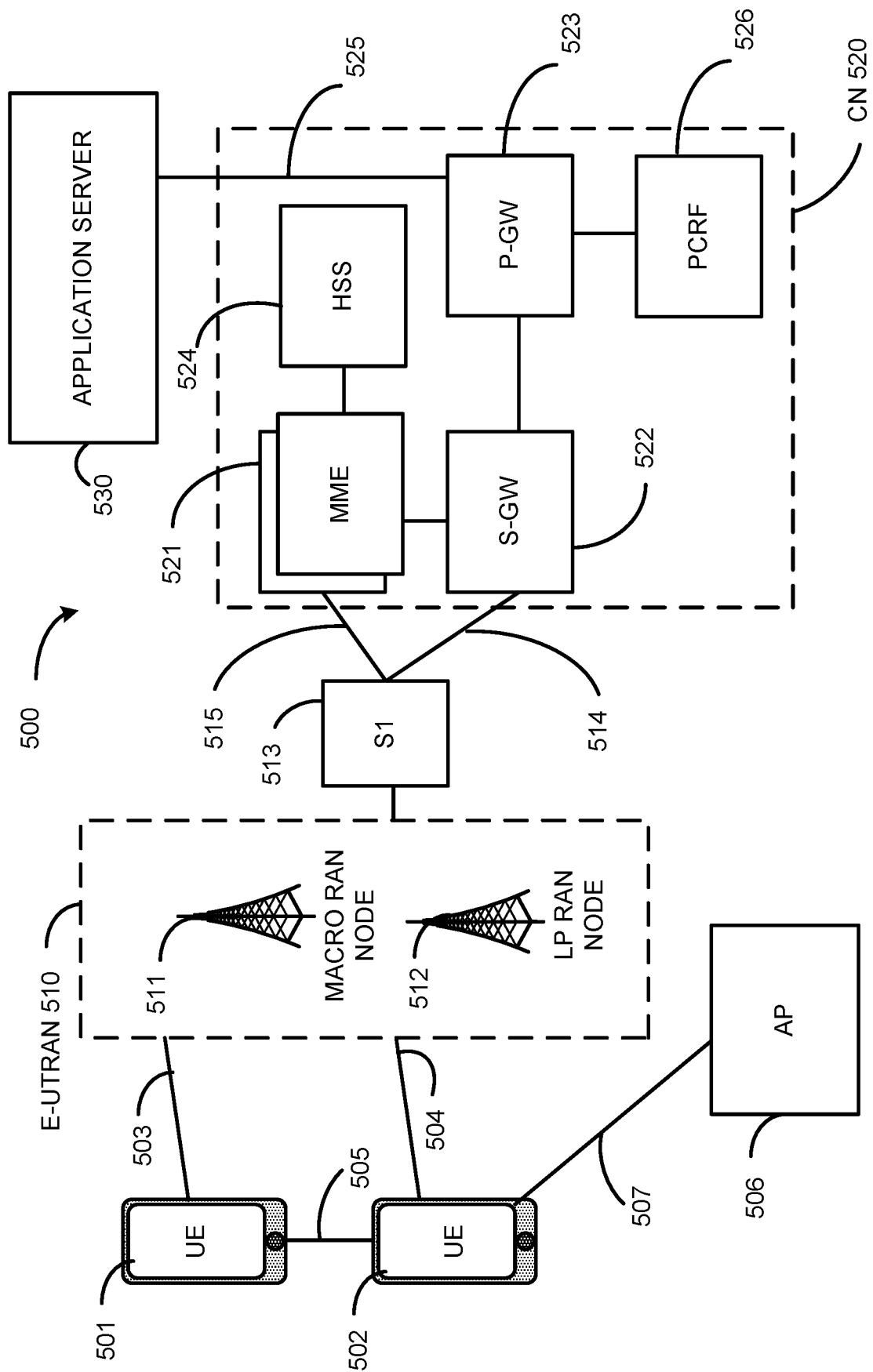
FIG. 5 depicts an architecture of a system of a network in accordance with some embodiments.

FIG. 5 illustrates an architecture of a system 500 of a network in accordance with some embodiments. The system 500 is shown to include a user equipment (UE) 501 and a UE 502. The UEs 501 and 502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510—the RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections 503 and 504, respectively, each of which comprises a physical communications interface or layer (discussed in further detail below); in this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 502 is shown to be configured to access an access point (AP) 506 via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below).

The RAN 510 can include one or more access nodes that enable the connections 503 and 504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 502 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 510 is shown to be communicatively coupled to a core network (CN) 520 via an S1 interface 513. In embodiments, the CN 520 may be an evolved packet core (EPC) network, a NextGen Packet Core (NPC) network, or some other type of CN. In this embodiment, the S1 interface 513 is split into two parts: the S1-U interface 514, which carries traffic data between the RAN nodes 511 and 512 and the serving gateway (S-GW) 522, and the S1-mobility management entity (MME) interface 515, which is a signaling interface between the RAN nodes 511 and 512 and MMES 521.

In this embodiment, the CN 520 comprises the MMES 521, the S-GW 522, the Packet Data Network (PDN) Gateway (P-GW) 523, and a home subscriber server (HSS) 524. The MMES 521 may be similar in function to the control plane of legacy Serving General Packet Radio Service (GPRS) Support Nodes (SGSN). The MMES 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the RAN 510, and routes data packets between the RAN 510 and the CN 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate an SGi interface toward a PDN. The P-GW 523 may route data packets between the EPC network and external networks such as a network including the application server 530 (alternatively referred to as application function (AF)) via an Internet Protocol (IP) interface 525. Generally, the application server 530 may be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525. The application server 530 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 may further be a node for policy enforcement and charging data collection. Policy and Charging Enforcement Function (PCRF) 526 is the policy and charging control element of the CN 520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate Quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
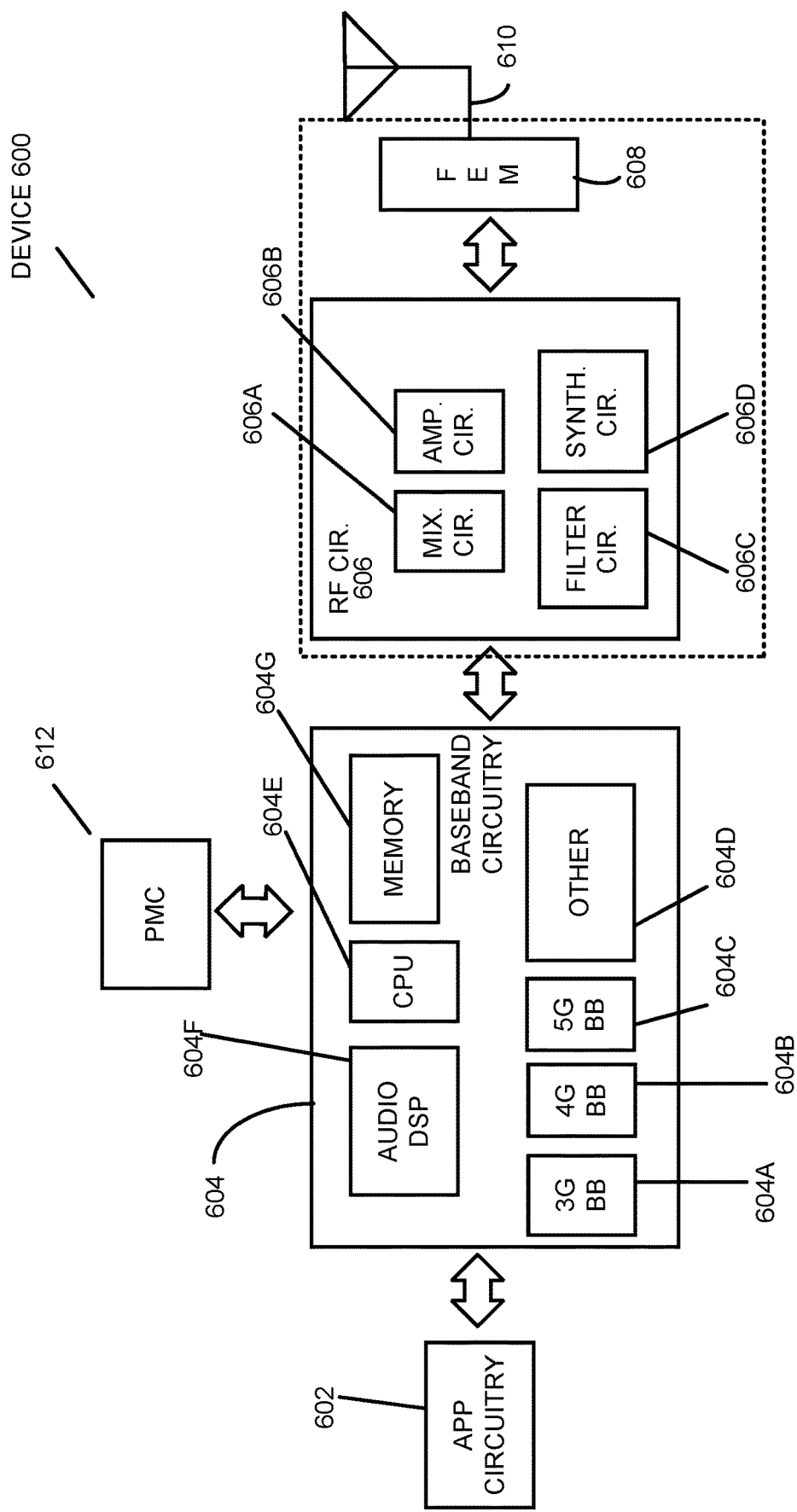
FIG. 6 depicts an example of components of a device in accordance with some embodiments.

FIG. 6 illustrates example components of a device 600 in accordance with some embodiments. In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a UE or a RAN node. In some embodiments, the device 600 may include fewer elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), sixth generation (6G), etc.). The baseband circuitry 604 (e.g., one or more of baseband processors 604A-D) may handle various radio control functions that enable communication with one or more radio networks via the RF circuitry 606. In other embodiments, some or all of the functionality of baseband processors 604A-D may be included in modules stored in the memory 604G and executed via a Central Processing Unit (CPU) 604E. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606a, amplifier circuitry 606b and filter circuitry 606c. In some embodiments, the transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c.

In some embodiments, the mixer circuitry 606a of the receive signal path and the mixer circuitry 606a of the transmit signal path may include two or more mixers and may be arranged for quadrature downconversion and upconversion, respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a of the transmit signal path may be arranged for direct downconversion and direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path, which may include circuitry configured to operate on RF signals received from one or more antennas 610, amplify the received signals and provide the amplified versions of the received signals to the RF circuitry 606 for further processing. FEM circuitry 608 may also include a transmit signal path, which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry 608 may include a receive signal path and a transmit signal path. The receive signal path of the FEM circuitry 608 may include a low noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device is included in a UE. The PMC 612 may increase the power conversion efficiency while providing desirable implementation size and heat dissipation characteristics.

FIG. 6 shows the PMC 612 coupled only with the baseband circuitry 604. However, in other embodiments, the PMC 612 may be additionally or alternatively coupled with, and perform similar power management operations for, other components such as, but not limited to, application circuitry 602, RF circuitry 606, or FEM 608.

In some embodiments, the PMC 612 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC_Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used to execute Layer 3, Layer 2, or Layer 1 functionality, while processors of the application circuitry 602 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
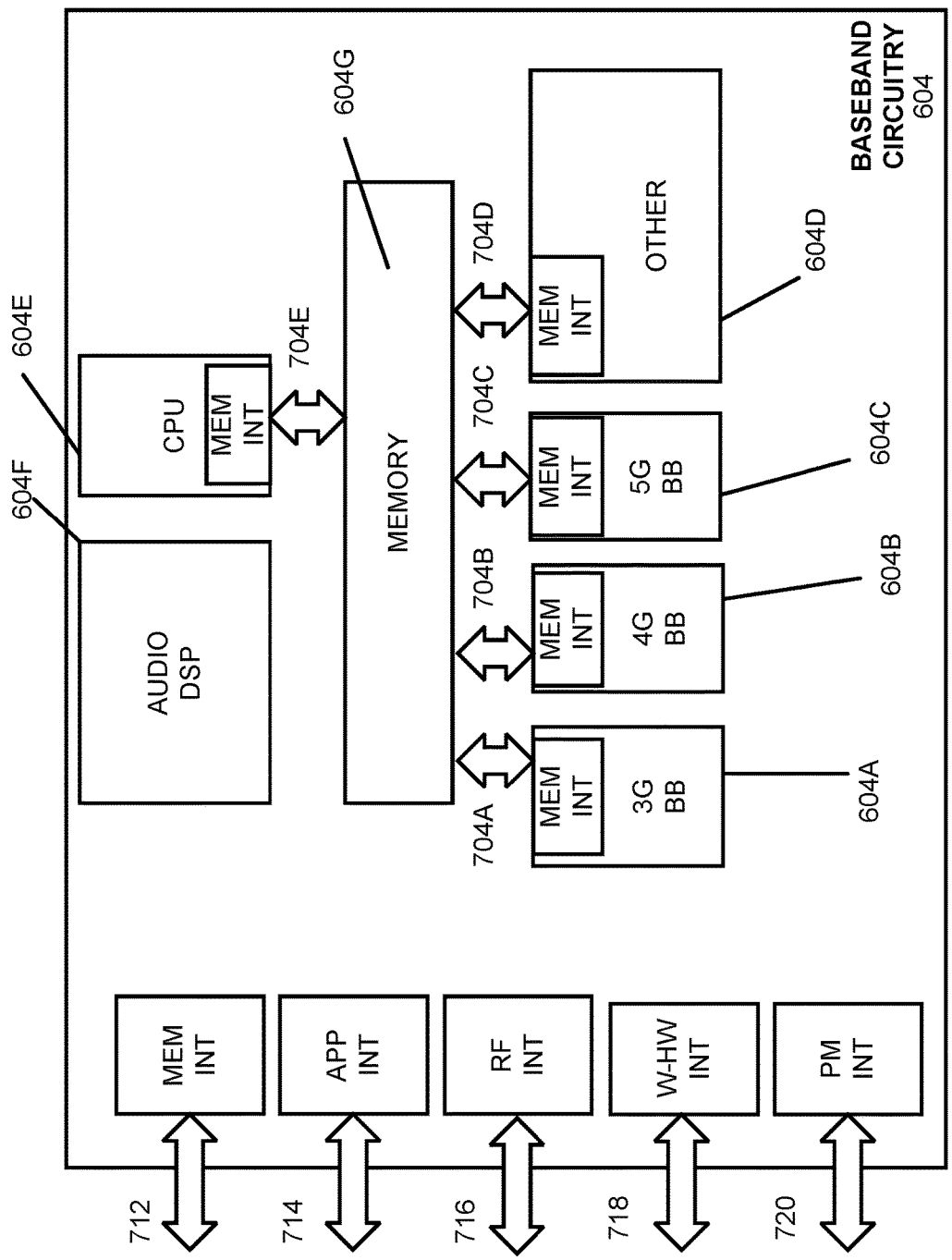
FIG. 7 depicts an example of interfaces of baseband circuitry in accordance with some embodiments.

FIG. 7 illustrates example interfaces of baseband circuitry in accordance with some embodiments. As discussed above, the baseband circuitry 604 of FIG. 6 may comprise processors 604A-604E and a memory 604G utilized by said processors. Each of the processors 604A-604E may include a memory interface, 704A-704E, respectively, to send/receive data to/from the memory 604G.

The baseband circuitry 604 may further include one or more interfaces to communicatively couple to other circuitries/devices, such as a memory interface 712 (e.g., an interface to send/receive data to/from memory external to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMC 612.

Figure 8:
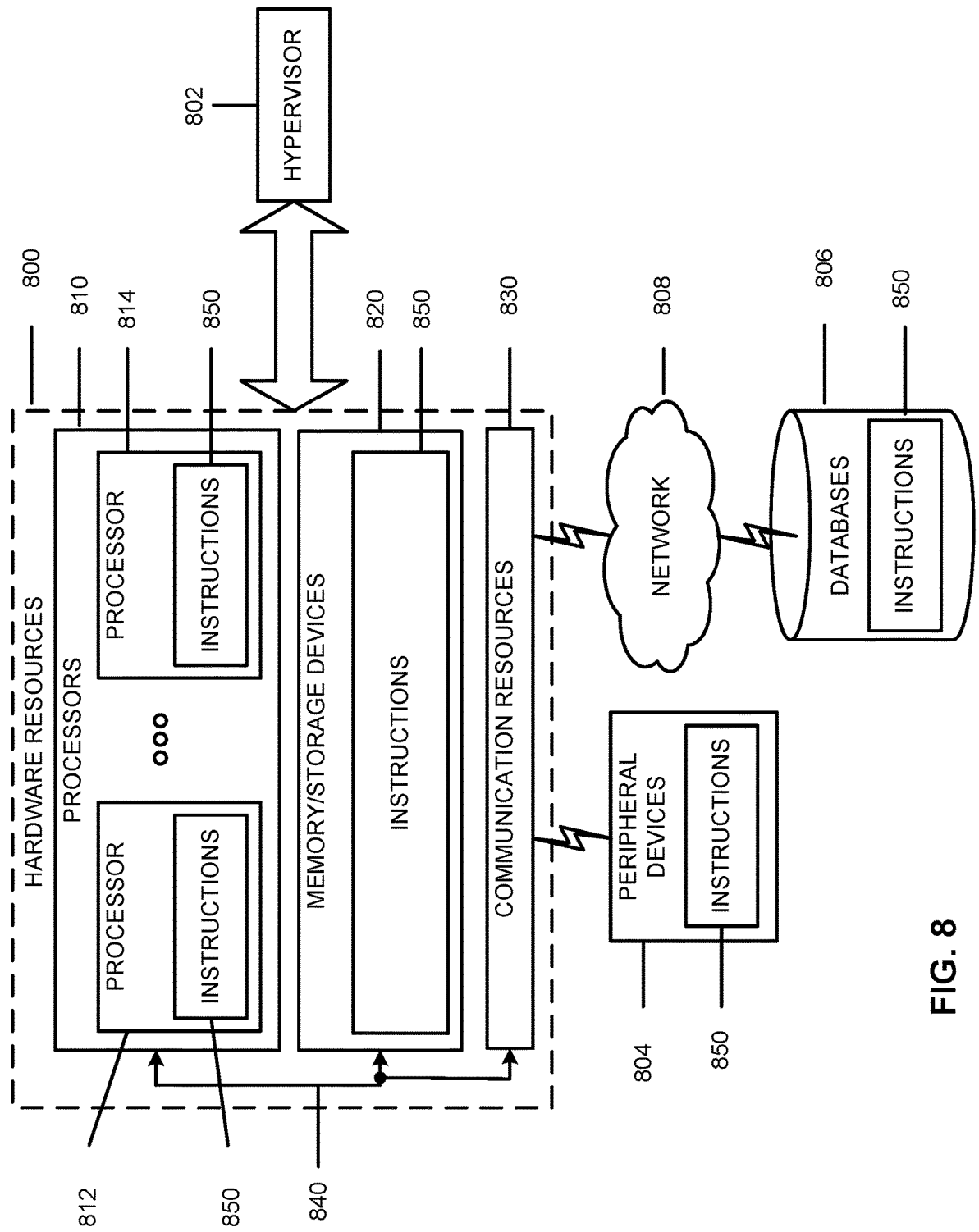
FIG. 8 depicts a block diagram illustrating components, according to some embodiments, able to read instructions from a machine-readable or computer-readable medium (e.g., a non-transitory machine-readable storage medium) and perform any one or more of the methodologies discussed herein.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800.

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814.

The memory/storage devices 820 may include main memory, disk storage, or any suitable combination thereof. The memory/storage devices 820 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

In various embodiments, the devices/components of FIGS. 5-8, and particularly the baseband circuitry of FIG. 7, may be used to practice, in whole or in part, any of the operation flow/algorithmic structures depicted in FIGS. 1-3.

One example of an operation flow/algorithmic structure is depicted in FIG. 1, which may be performed by a next-generation NodeB (gNB) or portion thereof in some embodiments. In this example, operation flow/algorithmic structure 100 may include, at 105, retrieving information regarding one or more transport blocks (TBs) of a physical uplink shared channel (PUSCH). Operation flow/algorithmic structure 100 may further include, at 110, determining one or more new data indicators (NDIs) for the respective one or more TBs based on the information regarding the one or more TBs. Operation flow/algorithmic structure 100 may further include, at 115, encoding a downlink control information (DCI) message for transmission to a user equipment (UE) to schedule transmission of one or more TBs in a respective one or more transmission time intervals (TTIs), wherein the DCI includes the one or more NDIs and an indication of a number of the one or more transmission time intervals (TTIs).

Another example of an operation flow/algorithmic structure is depicted in FIG. 2, which may be performed by a next-generation NodeB (gNB) or portion thereof in some embodiments. In this example, operation flow/algorithmic structure 200 may include, at 205, determining one or more new data indicator (NDIs) associated with one or more transport blocks (TBs). Operation flow/algorithmic structure 200 may further include, at 210, encoding a downlink control information (DCI) message for transmission to a user equipment (UE) that includes an indication of the one or more NDIs and an indication of a number of scheduled transmission time intervals (TTIs) for a physical uplink shared channel (PUSCH).

Another example of an operation flow/algorithmic structure is depicted in FIG. 3, which may be performed by a user equipment (UE) or portion thereof in some embodiments. In this example, operation flow/algorithmic structure 300 may include, at 305, receiving a downlink control information (DCI) message that includes an indication of one or more new data indicators (NDIs) associated with a respective one or more transport block (TBs) for transmission of a physical uplink shared channel (PUSCH) in a respective number of one or more scheduled transmission time intervals (TTIs) for the PUSCH. Operation flow/algorithmic structure 300 may further include, at 310, encoding the PUSCH for transmission based on the DCI.

EXAMPLES

Some non-limiting examples are provided below.

Example 1 includes an apparatus comprising: memory to store information regarding one or more transport blocks (TBs) of a physical uplink shared channel (PUSCH); and processor circuitry, coupled with the memory, to: retrieve the information regarding the one or more TBs from the memory; determine one or more new data indicators (NDIs) for the respective one or more TBs based on the information regarding the one or more TBs; and encode a downlink control information (DCI) message for transmission to a user equipment (UE) to schedule transmission of one or more TBs in a respective one or more transmission time intervals (TTIs), wherein the DCI includes the one or more NDIs and an indication of a number of the one or more transmission time intervals (TTIs).

Example 2 includes the apparatus of example 1 or some other example herein, wherein the DCI further includes a respective indication of a redundancy version (RV) associated with each respective TB from the one or more TBs.

Example 3 includes the apparatus of example 2 or some other example herein, wherein the one or more TTIs is a single TTI, and wherein the RV for the single TTI is represented in a two-bit field in the DCI.

Example 4 includes the apparatus of example 2 or some other example herein, wherein the one or more TTIs includes a plurality of TTIs, the one or more TBs include a plurality of TBs, and wherein the respective RV associated with each respective TB from the plurality of TBs is represented in a one-bit field in the DCI.

Example 5 includes the apparatus of example 1 or some other example herein, wherein the DCI further includes an indication of a time domain resource allocation (TDRA).

Example 6 includes the apparatus of example 5 or some other example herein, wherein the indication of the TDRA is jointly coded with the indication of the number of the one or more TTIs.

Example 7 includes the apparatus of example 5 or some other example herein, wherein the DCI further includes an indication of a number of start and length indicator values (SLIVs) for a TDRA codepoint.

Example 8 includes the apparatus of example 1 or some other example herein, wherein the processor circuitry is to include includes an indication of code block group transmission information (CBGTI) in the DCI based on a determination that the one or more TTIs are a single TTI and the one or more TBs are a single TB.

Example 9 includes the apparatus of example 1 or some other example herein, wherein the one or more TTIs include a plurality of TTIs, wherein the one or more TBs include a respective plurality of TBs, and wherein each respective one TB of the plurality of TBs is scheduled for transmission in a respective one TTI from the plurality of TTIs.

Example 10 includes one or more non-transitory computer-readable media storing instructions that, when executed by one or more processors, are to cause a next-generation NodeB (gNB) to: determine one or more new data indicator (NDIs) associated with one or more transport blocks (TBs); and encode a downlink control information (DCI) message for transmission to a user equipment (UE) that includes an indication of the one or more NDIs and an indication of a number of scheduled transmission time intervals (TTIs) for a physical uplink shared channel (PUSCH).

Example 11 includes the one or more non-transitory computer-readable media of example 10 or some other example herein, wherein the DCI further includes a respective indication of a redundancy version (RV) associated with each respective TB from the one or more TBs, wherein the indication of the RV is two bits if the number of one or more TBs is one and is one bit if the number of one or more TBs is two or more.

Example 12 includes the one or more non-transitory computer-readable media of example 10 or some other example herein, wherein the DCI further includes an indication of a time domain resource allocation (TDRA).

Example 13 includes the one or more non-transitory computer-readable media of example 12 or some other example herein, wherein the indication of the TDRA is jointly coded with the indication of the number of scheduled TTIs.

Example 14 includes the one or more non-transitory computer-readable media of example 12 or some other example herein, wherein the DCI further includes an indication of a number of start and length indicator values (SLIVs) for a TDRA codepoint.

Example 15 includes the one or more non-transitory computer-readable media of example 10 or some other example herein, wherein the one or more TTIs is a single TTI, the one or more TBs is a single TB, and the DCI further includes an indication of code block group transmission information (CBGTI) for the single TB.

Example 16 includes the one or more non-transitory computer-readable media of example 10 or some other example herein, wherein the one or more TTIs include a plurality of TTIs, wherein the one or more TBs include a respective plurality of TBs, and wherein each respective one TB of the plurality of TBs is scheduled for transmission in a respective one TTI from the plurality of TTIs.

Example 17 includes one or more non-transitory computer-readable media storing instructions that, when executed by one or more processors, cause a user equipment (UE) to: receive a downlink control information (DCI) message that includes an indication of one or more new data indicators (NDIs) associated with a respective one or more transport block (TBs) for transmission of a physical uplink shared channel (PUSCH) in a respective number of one or more scheduled transmission time intervals (TTIs) for the PUSCH; and encode the PUSCH for transmission based on the DCI.

Example 18 includes the one or more non-transitory computer-readable media of example 17 or some other example herein, wherein the DCI further includes a respective indication of a redundancy version (RV) associated with each respective TB from the one or more TBs, wherein the respective indication of the RV is two bits if the number of one or more TBs is one and is one bit if the number of one or more TBs is two or more.

Example 19 includes the one or more non-transitory computer-readable media of example 17 or some other example herein, wherein the DCI further includes an indication of a time domain resource allocation (TDRA).

Example 20 includes the one or more non-transitory computer-readable media of example 19 or some other example herein, wherein the indication of the TDRA is jointly coded with the indication of the one or more scheduled TTIs.

Example 21 includes the one or more non-transitory computer-readable media of example 19 or some other example herein, wherein the DCI further includes an indication of a number of start and length indicator values (SLIVs) for a TDRA codepoint.

Example 22 includes the one or more non-transitory computer-readable media of example 17 or some other example herein, wherein the one or more TTIs is a single TTI, the one or more TBs is a single TB, and the DCI further includes an indication of code block group transmission information (CBGTI) for the single TB.

Example 23 includes the one or more non-transitory computer-readable media of example 17 or some other example herein, wherein the one or more TTIs include a plurality of TTIs, wherein the one or more TBs include a respective plurality of TBs, and wherein each respective one TB of the plurality of TBs is scheduled for transmission in a respective one TTI from the plurality of TTIs.

Example 24 may include an apparatus comprising means to perform one or more elements of a method described in or related to any of examples 1-23, or any other method or process described herein.

Example 25 may include one or more non-transitory computer-readable media comprising instructions to cause an electronic device, upon execution of the instructions by one or more processors of the electronic device, to perform one or more elements of a method described in or related to any of examples 1-23, or any other method or process described herein.

Example 26 may include an apparatus comprising logic, modules, and/or circuitry to perform one or more elements of a method described in or related to any of examples 1-23, or any other method or process described herein.

Example 27 may include a method, technique, or process as described in or related to any of examples 1-23, or portions or parts thereof.

Example 28 may include an apparatus comprising: one or more processors and one or more computer-readable media comprising instructions that, when executed by the one or more processors, cause the one or more processors to perform the method, techniques, or process as described in or related to any of examples 1-23, or portions thereof.

Example 29 may include a method of communicating in a wireless network as shown and described herein.

Example 30 may include a system for providing wireless communication as shown and described herein.

Example 31 may include a device for providing wireless communication as shown and described herein.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure.

What is claimed is:

1. An apparatus comprising:
   memory to store information regarding one or more transport blocks (TBs) of a physical uplink shared channel (PUSCH); and
   processor circuitry, coupled with the memory, to:
   retrieve the information regarding the one or more TBs from the memory;
   determine a respective one or more new data indicators (NDIs) for the respective one or more TBs based on the information regarding the one or more TBs; and
   encode a downlink control information (DCI) message for transmission to a user equipment (UE) to schedule transmission of one or more TBs in a plurality of transmission time intervals (TTIs), wherein the DCI includes: the one or more NDIs, an indication of a number of the plurality of TTIs, and a respective indication of a redundancy version (RV) associated with each respective TB from the one or more TBs, and wherein the respective indication of the RV is two bits if the number of one or more TBs is one and is one bit if the number of one or more TBs is two or more.

2. The apparatus of claim 1, wherein the one or more TBs include a plurality of TBs, and wherein the respective RV associated with each respective TB from the plurality of TBs is represented in a one-bit field in the DCI.

3. The apparatus of claim 1, wherein the DCI further includes an indication of a time domain resource allocation (TDRA).

4. The apparatus of claim 3, wherein the indication of the TDRA is jointly coded with the indication of the number of the plurality of TTIs.

5. The apparatus of claim 3, wherein the DCI further includes an indication of a number of start and length indicator values (SLIVs) for a TDRA codepoint.

6. The apparatus of claim 1, wherein the one or more TBs include a respective plurality of TBs, and wherein each respective one TB of the plurality of TBs is scheduled for transmission in a respective one TTI from the plurality of TTIs.

7. One or more non-transitory computer-readable media storing instructions that, when executed by one or more processors, are to cause a next-generation NodeB (gNB) to:
   determine one or more new data indicators (NDIs) associated with one or more transport blocks (TBs); and
   encode a downlink control information (DCI) message for transmission to a user equipment (UE) that includes an indication of the one or more NDIs and an indication of a number of a plurality of scheduled transmission time intervals (TTIs) for a physical uplink shared channel (PUSCH), wherein the DCI further includes a respective indication of a redundancy version (RV) associated with each respective TB from the one or more TBs, and wherein the indication of the RV is two bits if the number of one or more TBs is one and is one bit if the number of one or more TBs is two or more.

8. The one or more non-transitory computer-readable media of claim 7, wherein the DCI further includes an indication of a time domain resource allocation (TDRA).

9. The one or more non-transitory computer-readable media of claim 8, wherein the indication of the TDRA is jointly coded with the indication of the number of scheduled TTIs.

10. The one or more non-transitory computer-readable media of claim 8, wherein the DCI further includes an indication of a number of start and length indicator values (SLIVs) for a TDRA codepoint.

11. The one or more non-transitory computer-readable media of claim 7, wherein the one or more TBs include a respective plurality of TBs, and wherein each respective one TB of the plurality of TBs is scheduled for transmission in a respective one TTI from the plurality of TTIs.

12. One or more non-transitory computer-readable media storing instructions that, when executed by one or more processors, cause a user equipment (UE) to:
   receive a downlink control information (DCI) message that includes an indication of one or more new data indicators (NDIs) associated with a respective one or more transport block (TBs) for transmission of a physical uplink shared channel (PUSCH) in a respective number of a plurality of scheduled transmission time intervals (TTIs) for the PUSCH, wherein the DCI further includes a respective indication of a redundancy version (RV) associated with each respective TB from the one or more TBs, and wherein the respective indication of the RV is two bits if the number of one or more TBs is one and is one bit if the number of one or more TBs is two or more; and
   encode the PUSCH for transmission based on the DCI.

13. The one or more non-transitory computer-readable media of claim 12, wherein the DCI further includes an indication of a time domain resource allocation (TDRA).

14. The one or more non-transitory computer-readable media of claim 13, wherein the indication of the TDRA is jointly coded with an indication of a number of the plurality of scheduled TTIs.

15. The one or more non-transitory computer-readable media of claim 13, wherein the DCI further includes an indication of a number of start and length indicator values (SLIVs) for a TDRA codepoint.

16. The one or more non-transitory computer-readable media of claim 12, wherein the one or more TBs include a respective plurality of TBs, and wherein each respective one TB of the plurality of TBs is scheduled for transmission in a respective one TTI from the plurality of TTIs.

* * * * *